US011415054B2

(12) United States Patent
Sekiguchi

(10) Patent No.: US 11,415,054 B2
(45) Date of Patent: Aug. 16, 2022

(54) GAS TURBINE COMBINED CYCLE SYSTEM EQUIPPED WITH CONTROL DEVICE AND ITS CONTROL METHOD

(71) Applicant: Mitsubishi Heavy Industries, Ltd., Tokyo (JP)

(72) Inventor: Tatsuya Sekiguchi, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 237 days.

(21) Appl. No.: 16/033,249

(22) Filed: Jul. 12, 2018

(65) Prior Publication Data

US 2019/0063327 A1 Feb. 28, 2019

(30) Foreign Application Priority Data

Aug. 31, 2017 (JP) .............................. JP2017-167217

(51) Int. Cl.
| F02C 7/224 | (2006.01) |
| F01K 23/10 | (2006.01) |
| F02C 6/18 | (2006.01) |
| F02C 7/26 | (2006.01) |
| F02C 3/04 | (2006.01) |

(52) U.S. Cl.
CPC .............. *F02C 7/224* (2013.01); *F01K 23/10* (2013.01); *F02C 6/18* (2013.01); *F02C 7/26* (2013.01); *F02C 3/04* (2013.01); *F05D 2220/722* (2013.01); *F05D 2270/303* (2013.01)

(58) Field of Classification Search
CPC .... F02C 7/224; F02C 7/26; F02C 6/08; F02C 9/18; F02C 9/28; F01K 23/10; F05D 2260/85; F05D 2270/303; F05D 2270/3032
See application file for complete search history.

(56) References Cited

U.S. PATENT DOCUMENTS 3,049,878 A * 8/1962 Goodall .................... F02C 6/08
60/785
5,124,052 A * 6/1992 Hardaker ................ F02C 7/224
210/774

(Continued)

FOREIGN PATENT DOCUMENTS

| EP | 0 931 911 A2 | 7/1999 |
| EP | 2 351 915 A1 | 8/2011 |

(Continued)

OTHER PUBLICATIONS

Consumer Gas Cooperative, "Advantages & Disadvantages of Natural Gas" Jul. 28, 2017 (Year: 2017).*

(Continued)

*Primary Examiner* — Todd E Manahan
*Assistant Examiner* — Thuyhang N Nguyen
(74) *Attorney, Agent, or Firm* — Mattingly & Malur, PC

(57) ABSTRACT

In addition to a first fuel gas heater utilizing the heated water from the outlet of an economizer of a heat recovery steam boiler, there is provided a second fuel gas heater utilizing as the heat source the bleed air of a compressor of a gas turbine. A control device opens a bleed air control valve of the piping for supplying bleed air to the second fuel gas heater at the time of starting the gas turbine combined cycle system to heat a fuel gas by the bleed air.

6 Claims, 5 Drawing Sheets

(56) References Cited

U.S. PATENT DOCUMENTS

| | | | | |
|---|---|---|---|---|
| 5,423,178 | A * | 6/1995 | Mains | F23D 11/36 |
| | | | | 239/132.5 |
| 5,826,430 | A * | 10/1998 | Little | F01K 23/10 |
| | | | | 60/736 |
| 6,101,982 | A * | 8/2000 | Fischer | F02C 7/224 |
| | | | | 122/1 R |
| 6,269,626 | B1 * | 8/2001 | Kim | F01K 23/106 |
| | | | | 122/7 B |
| 6,939,392 | B2 * | 9/2005 | Huang | B01D 63/084 |
| | | | | 95/46 |
| 9,470,145 | B2 * | 10/2016 | Ball, Jr. | F02C 7/224 |
| 2010/0319359 | A1 | 12/2010 | Holt et al. | |
| 2011/0016870 | A1 | 1/2011 | Kashler | |
| 2014/0165572 | A1 * | 6/2014 | Pang | F01K 3/12 |
| | | | | 60/736 |
| 2015/0275758 | A1 * | 10/2015 | Foutch | F02C 7/36 |
| | | | | 60/779 |
| 2016/0230663 | A1 * | 8/2016 | Mizukami | F02C 9/18 |
| 2017/0152796 | A9 * | 6/2017 | Kraft | F02C 7/22 |
| 2018/0135468 | A1 | 5/2018 | Kayahara et al. | |

FOREIGN PATENT DOCUMENTS

| | | |
|---|---|---|
| JP | 62-279209 A | 12/1987 |
| JP | 11-117712 A | 4/1999 |
| JP | 3676022 B2 | 7/2005 |
| JP | 3776564 B2 | 5/2006 |
| JP | 2011-1954 A | 1/2011 |
| JP | 2012-180774 A | 9/2012 |
| JP | 2013-40619 A | 2/2013 |
| JP | 2015-68314 A | 4/2015 |
| WO | 2016/194742 A1 | 12/2016 |

OTHER PUBLICATIONS

Korean Office Action received in corresponding Korean Application No. 10-2018-0100218 dated Jan. 9, 2020.
Korean Office Action received in corresponding Korean Application No. 10-2018-0100218 dated Feb. 21, 2020.
Korean Office Action received in corresponding Korean Application No. 10-2018-0100218 dated Jul. 12, 2019.
Indian Office Action received in corresponding Indian Application No. 201814027189 dated Feb. 27, 2020.
Extended European Search Report received in corresponding European Application No. 18187055.1 dated Jan. 24, 2019.
Chinese Office Action dated Aug. 3, 2020, received in corresponding Chinese Patent Application No. 201811006027.6.
Japanese Office Action received in corresponding Japanese Application No. 2017-167217 dated Jun. 23, 2020.

* cited by examiner

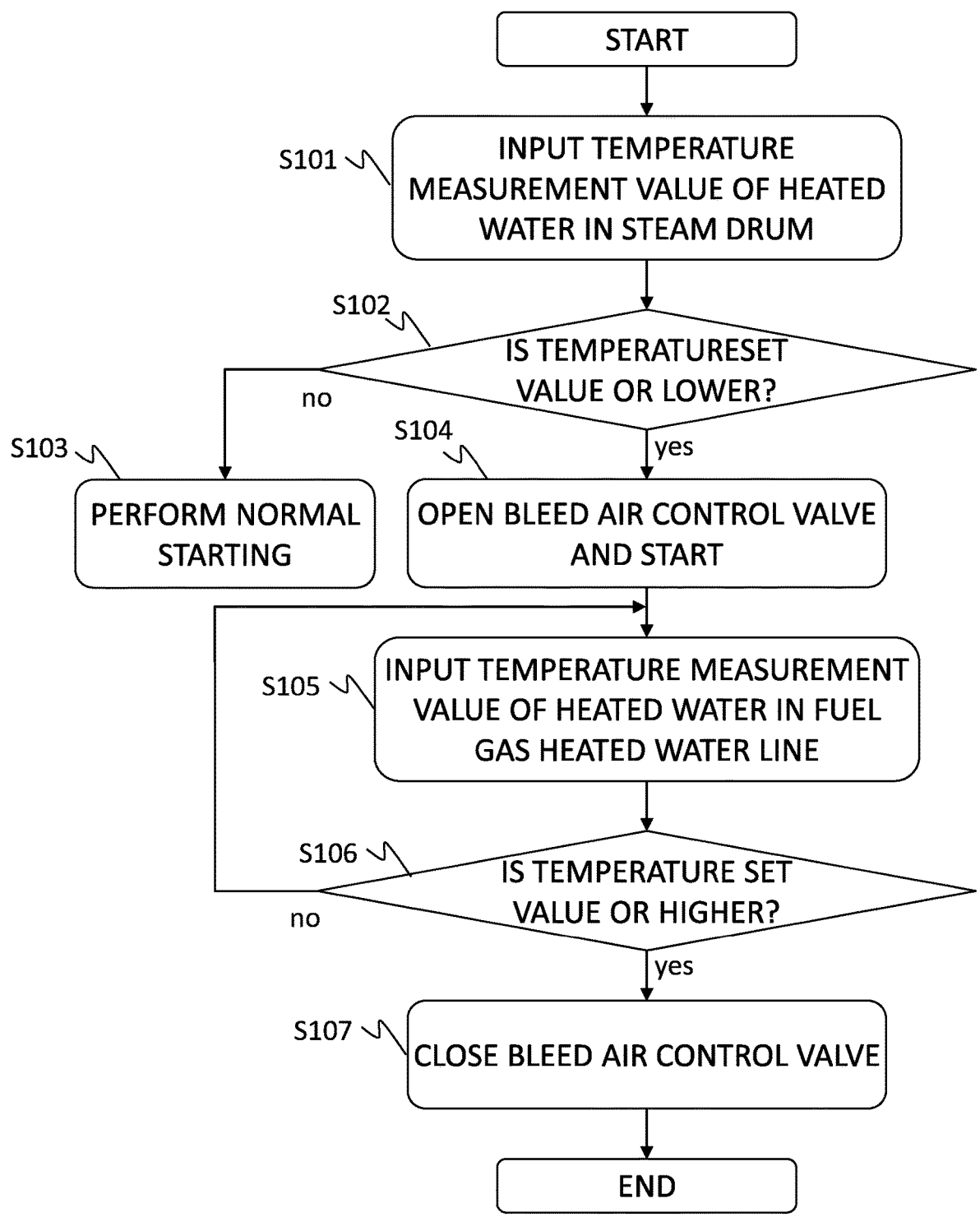

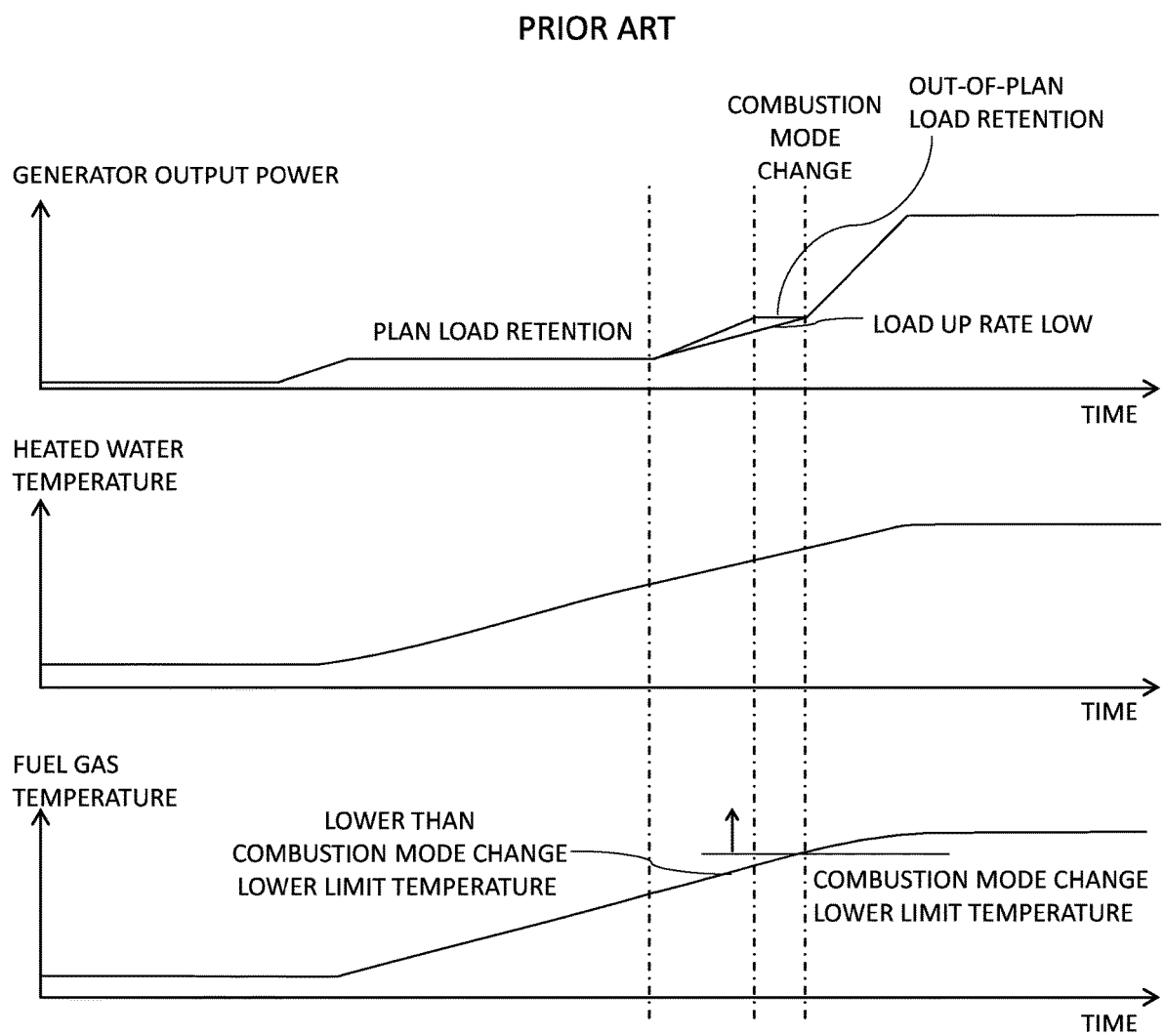

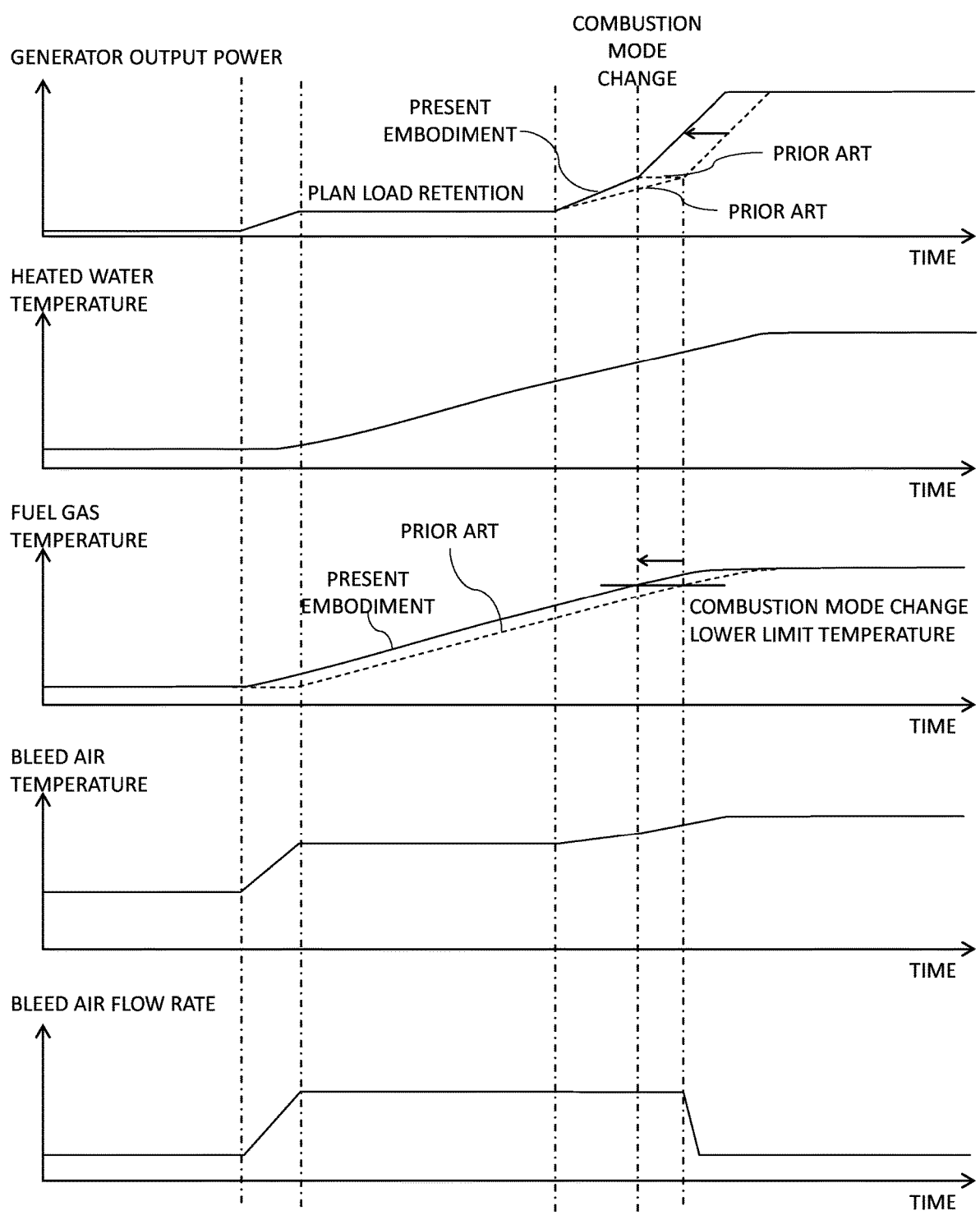

GAS TURBINE COMBINED CYCLE SYSTEM EQUIPPED WITH CONTROL DEVICE AND ITS CONTROL METHOD

BACKGROUND OF THE INVENTION

1. Field of the Invention

The present invention relates to a control device suitable for a gas turbine combined cycle system equipped with a fuel gas heater, a gas turbine combined cycle system equipped therewith, and a control method for the gas turbine combined cycle system.

2. Description of the Related Art

In adopting a dual pressure heat recovery steam boiler, in order to achieve an improvement in terms of plant efficiency without involving a reduction in plant output, JP-2015-68314-A discloses a combined cycle plant including fuel gas heating equipment having: a water extraction line extracting heated water from a heated water outlet of an intermediate pressure economizer installed in a heat recovery steam boiler; a low temperature fuel heater heating a fuel gas used in a gas turbine plant by using the heated water extracted through the water extraction line; a water extraction line extracting heated water from a heated water outlet of a high pressure secondary economizer situated on the upstream side in an exhaust gas flow path of the intermediate pressure economizer installed in the heat recovery steam boiler; a high temperature fuel heater for further heating the fuel gas heated by the low temperature fuel heater by using the heated water extracted through the water extraction line; and a heated water return line returning the heated water after the heating of the fuel gas at the high temperature fuel heater to the heated water outlet of the intermediate pressure economizer.

SUMMARY OF THE INVENTION

In recent years, in order to improve the generation efficiency of the gas turbine combined cycle system, there has been developed a generation system equipped with a fuel gas heater for heating the fuel gas of the gas turbine by utilizing the high temperature water supplied from the economizer outlet of the heat recovery steam boiler.

On the other hand, from the viewpoint of consideration for the environment, there is a demand for reducing the nitrogen oxides ($NO_x$) discharged from the gas turbine, and many premix combustion systems capable of reducing the $NO_x$ have been adopted for the combustor of the gas turbine.

In a gas turbine combustor with the ordinary premix combustion system, one combustor is provided with a plurality of burners, and, in the plant start-up, the combination of burners supplying the fuel gas is determined in accordance with the load of the gas turbine. Thus, in the plant start-up, the burners supplying the fuel gas are changed as appropriate in accordance with the increase in the gas turbine load (combustion mode change), thereby achieving a reduction in $NO_x$.

In this combustion mode change operation, it is necessary to properly control the temperature, specific weight, and heat generation amount of the fuel gas in accordance with the combustion mode in order to prevent combustion instability. An index called modified wobbe index (MWI) is used as the index for controlling the temperature, specific weight, and heat generation amount of the fuel gas. Equation (1) is used for the calculation of MWI.

$$MWI = LHV/\sqrt{(SG \times Tg)} \qquad (1)$$

Here, LHV represents the lower heating value of the fuel gas, SG represents the specific weight of the fuel, and Tg represents the temperature of the fuel gas.

Generally speaking, the heat capacity of the heat recovery steam boiler is large, so that, in the plant start-up, the increase in the temperature of the heated water supplied to the fuel gas heater takes time. Thus, in the conventional gas turbine combined cycle system as disclosed in JP-2015-68314-A, there have been cases where the temperature of the fuel gas has not been raised sufficiently with respect to the load of the gas turbine and where the MWI of the fuel gas is not within the range of the control value for the combustion mode change.

In this case, it is necessary to retain the load of the gas turbine until the MWI of the fuel gas enters the range of the control value by the temperature of the heated water supplied from the heat recovery steam boiler being increased and the temperature of the fuel gas being increased, and the MWI of the fuel gas enters the range of the control value, or to diminish the load up rate of the gas turbine. In both methods, it is difficult to shorten the plant start-up time.

It is an object of the present invention to provide a control device capable of shortening the plant start-up time as compared with the prior art, a gas turbine combined cycle system equipped with the same, and a control method for the gas turbine combined cycle system.

The present invention includes a plurality of means for solving the above problem, an example of which is a control device for controlling a gas turbine combined cycle system having: a turbine; a compressor; a heat recovery steam boiler; a first fuel gas heater that uses as a heat source a heated water led out of the heat recovery steam boiler to perform heat exchange between the heated water and a fuel gas guided to a combustor; a first valve provided in a line sending the heated water to the first fuel gas heater; a second fuel gas heater using as a heat source bleed air from the compressor to perform heat exchange between the bleed air and the fuel gas guided to the combustor; and a second valve provided in a line sending the bleed air to the second fuel gas heater. The control device executes control to open the second valve at a time of starting the gas turbine combined cycle system.

According to the present invention, it is possible to shorten the start-up time of the gas turbine combined cycle plant. Other problems, structure, and effects will become apparent from the following description of an embodiment.

BRIEF DESCRIPTION OF THE DRAWINGS

FIG. 3 is a diagram illustrating a control flow in the gas turbine combined cycle system according to the embodiment of the present invention;

FIG. 4 is a diagram illustrating the start trend in a conventional gas turbine combined cycle plant; and FIG. 5 is a diagram illustrating the start trend in the gas turbine combined cycle system according to the embodiment of the present invention.

DESCRIPTION OF THE PREFERRED EMBODIMENTS

A control device, a gas turbine combined cycle system equipped with the same, and a control method for the gas turbine combined cycle system according to an embodiment of the present invention will be described with reference to FIGS. 1 through 5.

Figure 1:
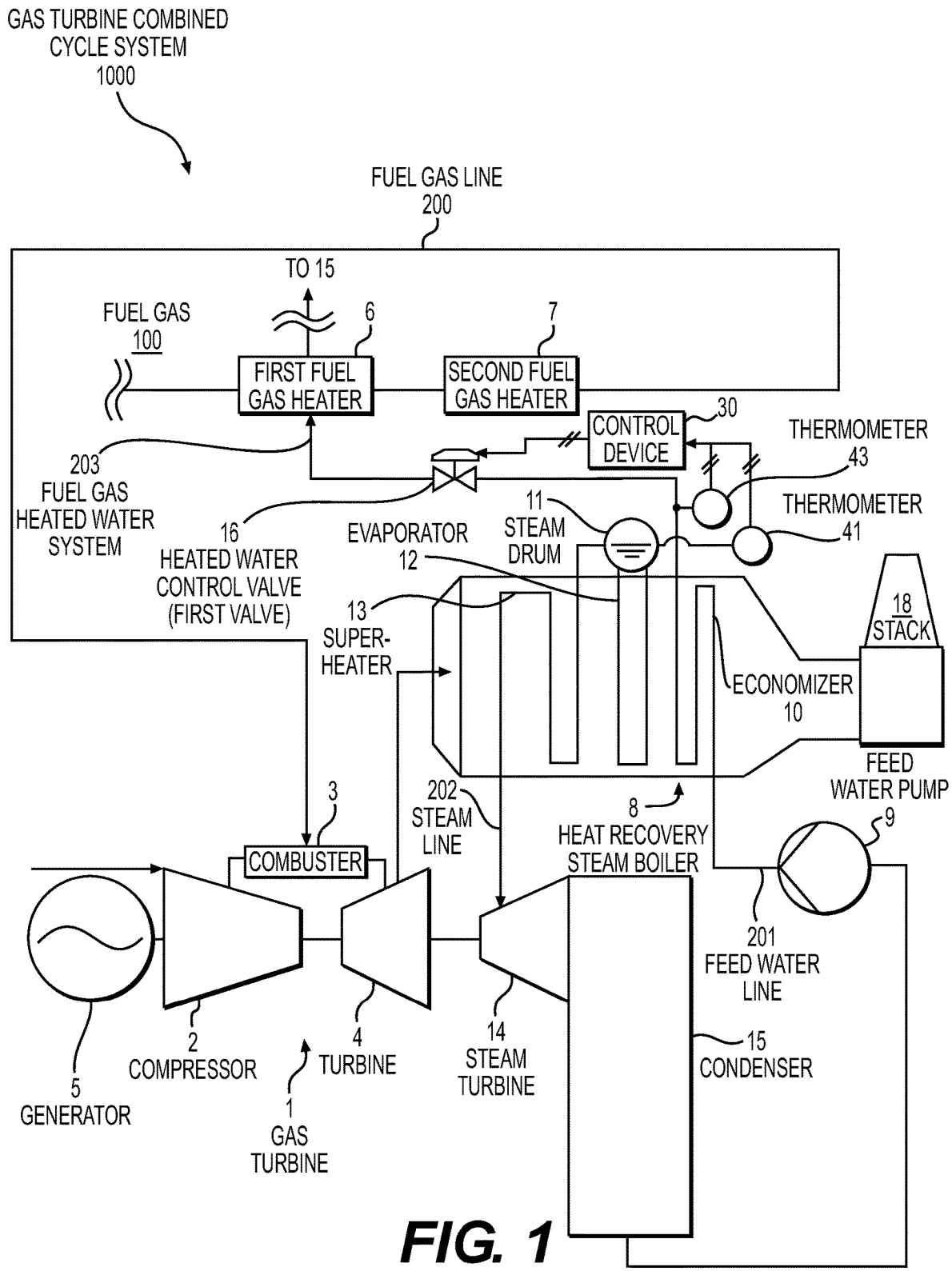
FIG. 1 is a system diagram illustrating the outline of a gas turbine, a heat recovery steam boiler, and a fuel gas in a gas turbine combined cycle system according to an embodiment of the present invention.
Figure 2:
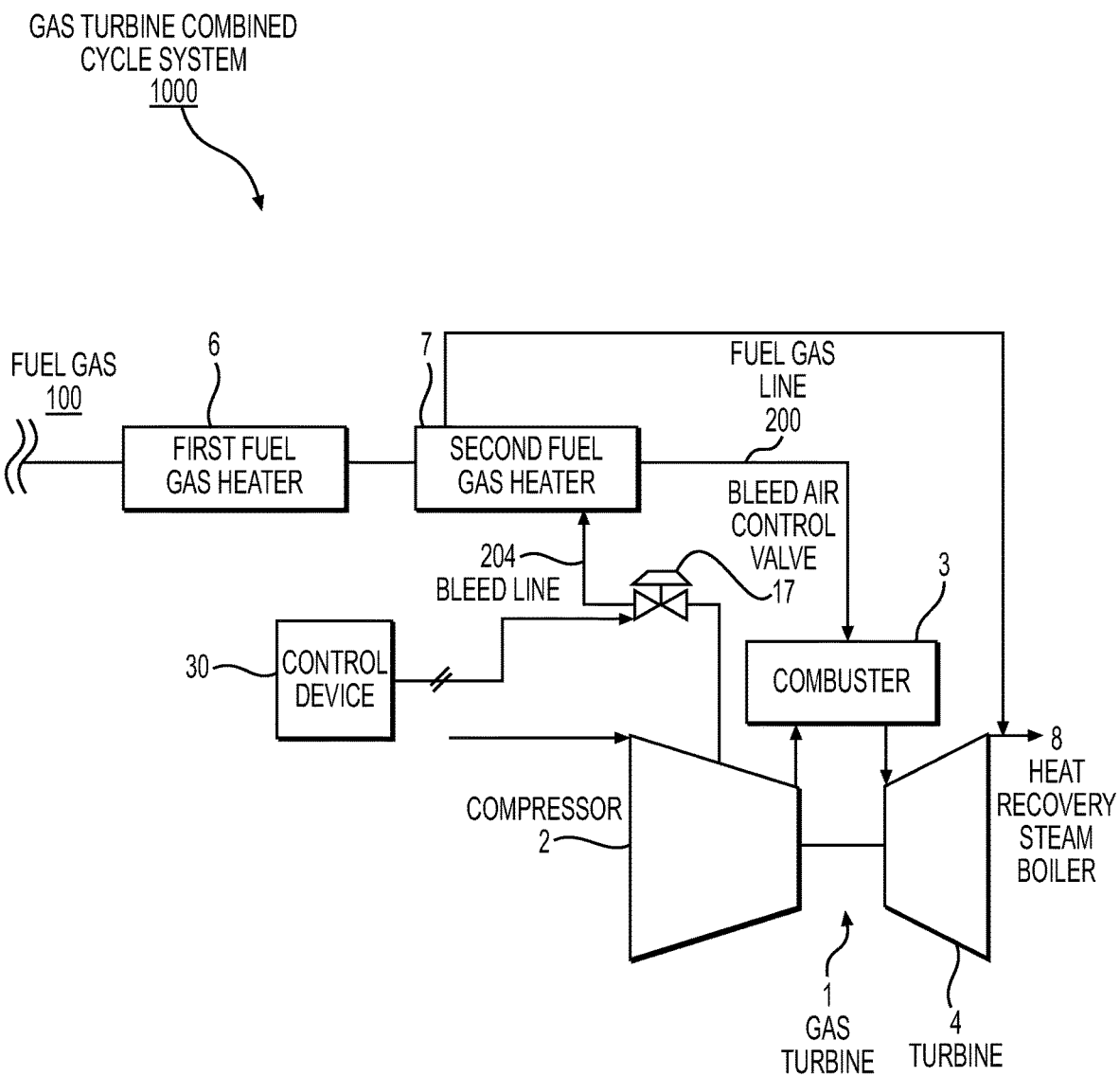
FIG. 2 is a system diagram illustrating the outline of the gas turbine, a compressor air bleed system, and a fuel gas heater in the gas turbine combined cycle system according to the embodiment of the present invention.

First, the outline of the gas turbine combined cycle system will be described with reference to FIGS. 1 and 2. The description will center on the gas turbine, the heat recovery steam boiler, and the fuel gas line. FIG. 1 is a system diagram illustrating the outline of a gas turbine, a heat recovery steam boiler, and a fuel gas in a gas turbine combined cycle system according to an embodiment of the present invention. FIG. 2 is a system diagram illustrating the outline of the gas turbine, a compressor air bleed system, and a fuel gas heater in the gas turbine combined cycle system according to the embodiment of the present invention.

In FIGS. 1 and 2, a gas turbine combined cycle system 1000 is equipped with a gas turbine 1, a steam turbine 14, a condenser 15, a heat recovery steam boiler 8, a stack 18, a fuel gas line 200, a feed water line 201, a steam line 202, a fuel gas heated water system 203, a bleed line 204, a control device 30, a thermometer 41, a thermometer 43, etc.

As shown in FIG. 1, the gas turbine 1 is composed of a compressor 2, a combustor 3, a turbine 4, and a generator 5.

The compressor 2 compresses external air through rotational drive to generate compressed air. The combustor 3 burns a fuel gas 100 in the compressed air generated by the compressor 2 to attain higher temperature and higher pressure. Connected to this combustor 3 is the fuel gas line 200 supplying the fuel gas 100. The turbine 4 is rotationally driven by the high-temperature/high-pressure fuel gas generated in the combustor 3. The generator 5 generates power through rotation of the turbine 4 and through rotation of the steam turbine 14 described below.

The fuel gas line 200 is formed by a first fuel gas heater 6, a second fuel gas heater 7, and piping, and connects a fuel gas supply source (not shown) and the combustor 3. The fuel gas 100 passes through the first fuel gas heater 6 and the second fuel gas heater 7, preferably in this order from the viewpoint of the temperature attained (which is approximately 100° C. at the first fuel gas heater 6 and approximately 200° C. at the second fuel gas heater 7). The order, however, may be reversed.

The first fuel gas heater 6 uses as the heat source the heated water led out from the heat recovery steam boiler 8 described below, and heats the fuel gas 100 guided to the combustor 3 through heat exchange between the heated water and the fuel gas 100.

The second fuel gas heater 7 uses as the heat source the bleed air from the compressor 2, and heats the fuel gas 100 guided to the combustor 3 through heat exchange between the bleed air and the fuel gas 100.

The bleed line 204 shown in FIG. 2 connects the intermediate stage of the compressor 2 and the second fuel gas heater 7. It is piping for bleeding compressed air from the intermediate stage of the compressor 2 and sending the bleed air to the second fuel gas heater 7. This bleed line 204 is provided with a bleed air control valve (second valve) 17. It is not necessary for the bleed line 204 to be provided at the intermediate stage of the compressor 2. It may be provided at the front stage on the upstream side or at the rear stage on the downstream side.

The steam turbine 14 is rotationally driven by the superheated steam generated at the heat recovery steam boiler 8.

The condenser 15 condenses the steam that has been used to drive the steam turbine 14 to water.

The heat recovery steam boiler 8 is provided on the downstream side of the turbine 4 in order to recover the energy of the exhaust gas led out of the turbine 4 of the gas turbine 1, and generates heated compressed water and steam through heat exchange with the exhaust gas. Connected to this heat recovery steam boiler 8 are the feed water line 201 and the steam line 202.

The feed water line 201 is piping connecting the condenser 15 and the heat recovery steam boiler 8. At some midpoint thereof, there is installed a feed water pump 9.

The steam line 202 is formed by an economizer 10, a steam drum 11, an evaporator 12, a superheater 13, and piping, and is connected to the condenser 15 via the steam turbine 14.

The economizer 10 heats water by utilizing the heat of the exhaust gas. The steam drum 11 separates the steam generated at the evaporator 12 and the water from each other. Here, the water means the water within the steam drum 11. The evaporator 12 further superheats the water heated by the economizer 10 by utilizing the heat of the exhaust gas to generate steam. The superheater 13 further heats the steam generated at the evaporator 12 by utilizing the heat of the exhaust gas to generate superheated steam of higher temperature.

Inside the steam drum 11, there is provided the thermometer 41 for measuring the temperature of the heated water on the inner side thereof.

Connected to the steam line 202 is a fuel gas heated water line 203 for branching off the heated water from the steam line 202 at the outlet of the economizer 10 and sending the heated water to the first fuel gas heater 6. Provided in this fuel gas heated water line 203 are a heated water control valve (first valve) 16 and the thermometer 43 for measuring the temperature of the heated water in the fuel gas heated water line 203.

The control device 30 controls the operation of each apparatus of the gas turbine combined cycle system 1000. In the present embodiment, in particular, the control device 30 executes control to open the bleed air control valve 17 at the time of starting the gas turbine combined cycle system 1000. In particular, the control device 30 of the present embodiment is configured to execute control such that the bleed air control valve 17 is opened at the time of starting the gas turbine combined cycle system 1000 in the case where the temperature of the heated water is equal to or lower than a set value (second predetermined value), and that the gas turbine combined cycle system 1000 is started in the normal fashion without opening the bleed air control valve 17 in the case where the temperature is higher than the set value. Further, when the temperature of the heated water is equal to or higher than another set value (first predetermined value), the control device 30 executes control to close the bleed air control valve 17.

The flow of air, fuel gas, water, and steam in the present embodiment will be described with reference to FIGS. 1 and 2.

In the gas turbine 1 shown in FIG. 1, the compressor 2 compresses air sucked in from the atmosphere, and supplies it to the combustor 3. The combustor 3 burns the compressed air and the fuel gas 100 to generate a high temperature combustion gas, and supplies it to the turbine 4.

Through the supply of the high pressure combustion gas, rotational power is imparted to the turbine 4, and the rotational power of the turbine 4 is transmitted to the compressor 2 and the generator 5. The rotational power transmitted to the compressor 2 is utilized as the compression power for the air, and the rotational power transmitted to the generator 5 is converted to electric energy.

The exhaust gas discharged from the turbine 4 is discharged from the stack 18 after having passed through the heat recovery steam boiler 8.

At the heat recovery steam boiler 8, the water is increased in pressure by the feed water pump 9 through the feed water line 201. The water flows into the economizer 10 and is increased in temperature through heat exchange with the fuel gas before flowing into the steam drum 11. The water in the steam drum 11 flows into the evaporator 12, and is turned into steam through heat exchange with the exhaust gas discharged from the turbine 4, and flows into the steam drum 11 again.

The steam in the steam drum 11 flows into the superheater 13, and undergoes heat exchange with the exhaust gas, whereby it becomes superheated steam, and flows into the steam turbine 14. Through the supply of the superheated steam, rotational power is imparted to the steam turbine 14, and the rotational power is transmitted to the generator 5 to be converted to electric energy.

The steam discharged from the steam turbine 14 flows into the condenser 15, and is cooled to be condensed to water. Then, it flows again into the heat recovery steam boiler 8 through the feed water pump 9.

Here, the fuel gas 100 passes through the heat sources of the first fuel gas heater 6 and the second fuel gas heater 7 in this order, and is heated to a predetermined temperature before being supplied to the combustor 3.

As described above, at the first fuel gas heater 6, as the heat source for heating the fuel gas 100, there is used the high temperature heated water branched off from the outlet of the economizer 10 of the heat recovery steam boiler 8. The heated water supplied to the first fuel gas heater 6 undergoes heat exchange with the fuel gas 100 to attain low temperature. Then, it is discharged from the first fuel gas heater 6 and is recovered by the condenser 15.

On the other hand, as described above, as the heat source for heating the fuel gas 100, the second fuel gas heater 7 uses the bleed air bled from the intermediate stage of the compressor 2. In the process of being compressed, the bleed air is increased in temperature, so that it can be used as the heat source for heating the fuel gas 100 at the second fuel gas heater 7. The bleed air supplied to the second fuel gas heater 7 undergoes heat exchange with the fuel gas 100 to attain low temperature. Then, it is discharged from the second fuel gas heater 7, and joins the exhaust gas at the outlet of the turbine 4 before being discharged from the stack 18.

Next, the control method for the gas turbine combined cycle system 1000 by the control device 30 of the present embodiment will be described with reference to FIG. 3. FIG. 3 is a diagram illustrating the control flow in the gas turbine combined cycle system according to the embodiment of the present invention. The control flow shown in FIG. 3 is executed at the time of starting the gas turbine combined cycle system.

In FIG. 3, the control device 30 first receives the input of the temperature of the heated water in the steam drum 11 as measured by the thermometer 41 (step S101).

Next, the control device 30 determines whether the temperature of the heated water in the steam drum 11 measured in step S101 is equal to or lower than the set value (second predetermined value) (step S102).

When it is determined that the temperature of the heated water is higher than the set value in this step S102, the temperature of the heated water within the steam drum 11 is high, and the fuel gas 100 can be sufficiently heated solely by the heated water sent to the first fuel gas heater 6. Thus, there is no need to heat the fuel gas 100 by utilizing the bleed of the compressor 2, so that the procedure advances to step S103, and the gas turbine combined cycle system 1000 is started in the normal fashion (step S103).

In contrast, when it is determined that the temperature of the heated water is equal to or lower than the set value in step S102, the procedure advances to step S104, and the control device 30 opens the bleed air control valve 17, and the system is started (step S104).

This step S104 corresponds to a procedure to open the bleed air control valve 17, which procedure being included in a program executed by the control device 30. The step S104 also corresponds to a process for opening the bleed air control valve 17, which process being included in a control method for the gas turbine combined cycle system 1000.

Further, these steps S102, S103, and S104 correspond to a procedure to open the bleed air control valve 17 when the temperature of the heated water is equal to or lower than a second predetermined value and not to open the bleed air control valve 17 when the temperature of the heated water is higher than the second predetermined value, which procedure being included in the program executed by the control device 30. The steps S102, S103, and S104 also correspond to a process for opening the bleed air control valve 17 when the temperature of the heated water is equal to or lower than the second predetermined value and not opening the bleed air control valve 17 when the temperature of the heated water is higher than the second predetermined value, which process being included in the control method for the gas turbine combined cycle system 1000.

Next, the control device 30 receives the input of the temperature, measured by the thermometer 43, of the heated water flowing within the fuel gas heated water line 203 (step S105).

Next, the control device 30 determines whether the temperature, measured in step S105, of the heated water flowing within the fuel gas heated water line 203 is equal to or higher than the set value (first predetermined value) (step S106).

When some time has elapsed since the start of the plant, the heat recovery steam boiler 8 is warmed, whereby the temperature of the heated water rises. When it is determined in this step S106 that the temperature of the heated water is equal to or higher than the set value, the heated water in the steam drum 11 has attained a sufficiently high temperature, making it possible to sufficiently heat the fuel gas 100 solely by the heated water sent to the first fuel gas heater 6. Thus, there is no need to heat the fuel gas 100 by utilizing the bleed air of the compressor 2. Thus, the procedure advances to step S107, and the control device 30 closes the bleed air control valve 17 (step S107). On the other hand, when it is determined that the temperature is lower than the set value, the procedure returns to step S105.

This step S107 corresponds to a procedure to close the bleed air control valve 17 when the temperature of the heated water becomes equal to or higher than the first predetermined value, which procedure being included in the program executed by the control device 30. The step S107 also corresponds to a process for closing the bleed air control valve 17 when the temperature of the heated water becomes equal to or higher than the first predetermined value, which process being included in the control method for the gas turbine combined cycle system 1000.

It is desirable for the second predetermined value used in step S102 and the first predetermined value used in step S106 to be set on the basis of the temperature allowing control of the MWI of the fuel gas solely by the heating by the first fuel gas heater 6 (the combustion mode change lower limit temperature shown in FIG. 5).

The start trend of the gas turbine combined cycle system of the present embodiment will be described with reference to FIGS. 4 and 5.

First, the trends of the generator output power, the heated water temperature, and the fuel gas temperature in the cold start of the conventional gas turbine combined cycle system will be described with reference to FIG. 4. FIG. 4 is a diagram illustrating the start trend in the conventional gas turbine combined cycle plant. In FIG. 4, the vertical axes indicate the output power of the generator 5, the temperature of the heated water sent to the first fuel gas heater 6, and the temperature of the fuel gas 100 in that order from above, and all the horizontal axes indicate time.

In the prior art technique shown in FIG. 4, as indicated by the trend of the generator output power, after the plant has been started and the load up is performed to attain a partial load, a plan load is retained for a fixed period of time to warm up the steam turbine and the heat recovery steam boiler. As the heat recovery steam boiler is warmed up, the temperature of the heated water and the temperature of the fuel gas are gradually raised.

When the fuel gas temperature continues to be raised to attain a level equal to or higher than a lower limit temperature at which the plan load retention is completed, the load up is started again.

In the prior art technique, when the load at which combustion mode change is to be effected is attained in the load up process, there may be a shortage in heating fuel gas due to the insufficiency of the temperature rise of the heat recovery steam boiler and the fuel gas temperature has not risen to a sufficient degree, resulting in the fuel gas temperature being equal to or lower than the lower temperature limit necessary for combustion mode change. In this case, the combustion mode change cannot be started until the fuel gas temperature has risen, and the load up cannot be performed.

To cope with this problem, it is necessary to effect an out-of-plan load retention until the fuel gas temperature attains a level equal to or higher than the combustion mode change lower temperature limit, or to diminish the load up rate from the plan load retention completion onward. Both methods take time, resulting in a rather long start-up time.

Next, the trends of the generator output power, the heated water temperature, the fuel gas temperature, the bleed air temperature, and the bleed air flow rate in the cold start of the present embodiment will be described with reference to FIG. 5. FIG. 5 is a diagram illustrating the start trend in the gas turbine combined cycle system in the present embodiment. In FIG. 5, the vertical axes indicate the output power of the generator 5, the temperature of the heated water sent to the first fuel gas heater 6, the temperature of the fuel gas 100, the temperature of the bleed air bled from the compressor 2, and the flow rate of the bleed air sent to the second fuel gas heater 7 in that order from above, and all the horizontal axes indicate time.

As described above, in the present embodiment, the bleeding from the compressor 2 is started after the start of the plant, and bleed air is supplied to the second fuel gas heater 7.

As shown in FIG. 5, the bleed air from the compressor 2 is raised in temperature substantially simultaneously with the load up of the gas turbine 1, so that the rising of the increase in the temperature of the fuel gas 100 is earlier than in the prior art technique shown in FIG. 4, and the fuel gas temperature during the plan load retention is higher than in the prior art technique.

Thus, the fuel gas temperature becomes, much earlier, equal to or higher than the lower limit temperature at which the plan load retention is completed, so that the requisite warming-up time for the combustion mode change can be shortened as compared with the prior art technique.

Thus, when, in the load up process, the load at which the combustion mode change is executed is attained, there is no need to wait for the fuel gas temperature to attain a level equal to or higher than the combustion mode change lower limit temperature. Thus, there is no need to perform an out-of-plan load retention or diminish the load up rate as in the prior art technique, thereby shortening the start-up time.

At the time when the fuel gas temperature becomes equal to or higher than the combustion mode change lower limit temperature in the prior technique, that is, when there is attained a temperature at which the fuel gas 100 can be heated solely by the heating by the first fuel gas heater 6, the bleed air control valve 17 is closed.

Next, the effect of the present embodiment will be described.

In the gas turbine combined cycle system 1000 of the present embodiment described above, in addition to the first fuel gas heater 6 utilizing the hot water from the outlet of the economizer 10 of the heat recovery steam boiler 8, there is provided the second fuel gas heater 7 utilizing as the heat source the bleed air of the compressor 2 of the gas turbine 1, and the control device 30 opens the bleed air control valve 17 of the piping for supplying the bleed intake air to the second fuel gas heater 7 at the time of starting the gas turbine combined cycle system 1000 to thereby execute the heating control of the fuel gas 100 by the bleed air.

The heat capacity of the heat recovery steam boiler 8 is large, so that, immediately after the start of the plant, the temperature of the heated water supplied to the first fuel gas heater 6 has not risen to a sufficient degree. On the other hand, the bleed air bled from the intermediate stage of the compressor 2 is of higher responsiveness in terms of temperature as compared with the heated water, and undergoes a temperature rise simultaneously with the load up of the gas turbine 1. Thus, in addition to the heated water control valve 16 supplying the heat source to the first fuel gas heater 6, the bleed air control valve 17 is opened, whereby it is possible to enhance the responsiveness of the temperature of the fuel gas 100. As a result, it is possible to expedite the temperature rise of the fuel gas 100 in the plant start-up as compared with the prior art, and there is no need to retain the load of the gas turbine in order to wait for the temperature rise of the fuel gas and there is no need to effect the load up at low rate in the start-up as in the conventional plant, making it possible to shorten the start-up time.

Further, the control device 30 executes control to close the bleed air control valve 17 when the temperature of the heated water is equal to or higher than the first predetermined value, so that it is possible to prevent a reduction in the output power and efficiency of the gas turbine due to the bleeding of the bleed air from the compressor 2 under the rated load condition from the high load condition of the plant, making it possible to operate the plant at high output power and high efficiency.

Further, the control device 30 executes control to open the bleed air control valve 17 at the time of starting the gas turbine combined cycle system 1000 when the temperature of the heater water is equal to or lower than the second predetermined value, and does not execute control to open the bleed air control valve 17 when the temperature of the heated water is higher than the second predetermined value, whereby it is possible to prevent a reduction in the output power and efficiency of the gas turbine due to the bleeding of the bleed air in the case where the heating of the fuel gas 100 by the bleed air is not necessary at the time of start-up, making it possible to operate the plant at high output power and at high efficiency.

[Others]

The present invention is not restricted to the above embodiment but allows various modifications and applications. The above embodiment, which has been described in detail in order to facilitate the understanding of the present invention, is not always restricted to structure equipped with all the components mentioned above.

For example, immediately after the start-up of the plant, the control device 30 may open the heated water control valve 16 and the bleed air control valve 17 without measuring the temperature within the steam drum 11, and supply heat source to both the first fuel gas heater 6 and the second fuel gas heater 7 to heat the fuel gas 100.

DESCRIPTION OF REFERENCE CHARACTERS

1: Gas turbine
2: Compressor
3: Combustor
4: Turbine
5: Generator
6: First fuel gas heater
7: Second fuel gas heater
8: Heat recovery steam boiler
9: Feed water pump
10: Economizer
11: Steam drum
12: Evaporator
13: Superheater
14: Steam turbine
15: Condenser
16: Heated water control valve (first valve)
17: Bleed air control valve (second valve)
18: Stack
30: Control device
41: Thermometer
43: Thermometer
100: Fuel gas
200: Fuel gas line
201: Feed water line
202: Steam line
203: Fuel gas heated water line
204: Bleed line
1000: Gas turbine combined cycle system

What is claimed is:

1. A controller executing a program for controlling a gas turbine combined cycle system having: a turbine; a compressor; a heat recovery steam boiler; a first fuel gas heater that uses as a heat source a heated water led out of the heat recovery steam boiler to perform heat exchange between the heated water and a fuel gas guided to a combustor; a first valve provided in a line sending the heated water to the first fuel gas heater; a second fuel gas heater using, as a heat source, bleed air from the compressor to perform heat exchange between the bleed air and the fuel gas guided to the combustor; and a second valve provided in a line sending the bleed air to the second fuel gas heater,
wherein the first fuel gas heater and the second fuel gas heater are connected in series,
wherein the fuel gas first passes through the first fuel gas heater and then passes through the second fuel gas heater and is then supplied to the combustor,
wherein the controller executes the program to:
upon receiving an input of a temperature of the heated water at a time of starting the gas turbine combined cycle system, determine whether the temperature of the heated water is equal to or lower than a first predetermined value;
when the temperature of the heated water is determined to be equal to or lower than the first predetermined value at the time of starting the gas turbine combined cycle system, open the first valve and second valve and use the heated water and the bleed air as both heat sources to heat the fuel gas; and
when the temperature of the heated water is determined to be higher than the first predetermined value at the time of starting the gas turbine combined cycle system, open only the first valve without executing to open the second valve, and use only the heated water as a heat source to heat the fuel gas.

2. The controller according to claim 1, wherein the controller executes the program to close the second valve when a temperature of the heated water is equal to or higher than a second predetermined value when the controller executes to open the second valve.

3. A control method for a gas turbine combined cycle system, the method comprising the steps of:
receiving an input of a temperature of the heated water at a time of starting the gas turbine combined cycle system;
determining whether the temperature of the heated water is equal to or lower than a first predetermined value;
when the temperature of the heated water is determined to be equal to or lower than the first predetermined value at the time of starting the gas turbine combined cycle system, opening a first valve provided in a line for sending a heated water derived from a heat recovery steam boiler, which is a heat source for a first fuel gas heater that exchanges heat with a fuel gas guided to the combustor, to the first fuel gas heater and a second valve provided in a line for sending a bleed air from a compressor to a second fuel gas heater so as to heat the fuel gas using the bleed air from the compressor and the heated water as both heat sources, the heat sources are supplied to the second fuel gas heater that exchanges heat with the fuel gas to heat the fuel gas when the temperature of the heated water is equal to or lower than a first predetermined value; and
when the temperature of the heated water is determined to be higher than the first predetermined value at the time of starting the gas turbine combined cycle system, opening only the first valve without opening the second valve, and only the heated water is used as the heat source to heat the fuel gas when the temperature of the heated water is higher than the first predetermined value;
wherein the first fuel gas heater and the second fuel gas heater are connected in series, and wherein the fuel gas first passes through the first fuel gas heater and then passes through the second fuel gas heater and is then supplied to the combustor.

4. The control method for the gas turbine combined cycle system according to claim 3, further comprising a step of closing the second valve when temperature of the heated water is equal to or higher than a second predetermined value when the controller executes to open the second valve.

5. A gas turbine combined cycle system comprising:
- a turbine;
- a compressor;
- a heat recovery steam boiler;
- a controller;
- a first fuel gas heater that uses as a heat source a heated water led out of the heat recovery steam boiler to perform heat exchange between the heated water and a fuel gas guided to a combustor;
- a first valve provided in a line sending the heated water to the first fuel gas heater;
- a second fuel gas heater using, as a heat source, bleed air from the compressor to perform heat exchange between the bleed air and the fuel gas guided to the combustor; and
- a second valve provided in a line sending the bleed air to the second fuel gas heater,
- wherein the first fuel gas heater and the second fuel gas heater are connected in series, wherein the fuel gas first passes through the first fuel gas heater and then passes through the second fuel gas heater and is then supplied to the combustor,
- wherein the controller executes a program to:
- upon receiving an input of a temperature of the heated water at a time of starting the gas turbine combined cycle system, determine whether the temperature of the heated water is equal to or lower than a first predetermined value;
- when the temperature of the heated water is determined to be equal to or lower than the first predetermined value at the time of starting the gas turbine combined cycle system, open the first valve and second valve and use the heated water and the bleed air as both heat sources to heat the fuel gas; and
- when the temperature of the heated water is determined to be higher than the first predetermined value at the time of starting the gas turbine combined cycle system, open only the first valve without executing to open the second valve, and use only the heated water as a heat source to heat the fuel gas.

6. The gas turbine combined cycle system according to claim 5, wherein the controller executes the program to control to close the second valve when a temperature of the heated water is equal to or higher than a second predetermined value when the controller executes to open the second valve.

\* \* \* \* \*